(12) United States Patent
Jagnow et al.

(10) Patent No.: US 10,878,599 B2
(45) Date of Patent: Dec. 29, 2020

(54) SOFT-OCCLUSION FOR COMPUTER GRAPHICS RENDERING

(71) Applicant: Google LLC, Mountain View, CA (US)

(72) Inventors: Robert Carl Jagnow, Mountain View, CA (US); Robert Raymond Pasquini, Sunnyvale, CA (US)

(73) Assignee: Google LLC, San Francisco, CA (US)

( * ) Notice: Subject to any disclaimer, the term of this patent is extended or adjusted under 35 U.S.C. 154(b) by 0 days.

(21) Appl. No.: 16/446,012

(22) Filed: Jun. 19, 2019

(65) Prior Publication Data

US 2020/0098140 A1    Mar. 26, 2020

(51) Int. Cl.
*G09G 5/00* (2006.01)
*G06T 11/00* (2006.01)
*G09G 5/36* (2006.01)

(52) U.S. Cl.
CPC ............ *G06T 11/00* (2013.01); *G09G 5/363* (2013.01); *G09G 2340/12* (2013.01)

(58) Field of Classification Search
CPC .............................. G06T 19/006; G06T 15/40
See application file for complete search history.

(56) References Cited

U.S. PATENT DOCUMENTS

| | | | |
|---|---|---|---|
| 9,726,896 B2 * | 8/2017 | von und zu Liechtenstein | G02B 27/0179 |
| 9,916,679 B2 * | 3/2018 | Flynn | G06K 9/4628 |
| 2012/0206452 A1 | 8/2012 | Geisner et al. | |
| 2013/0127895 A1 * | 5/2013 | Miller | G06T 15/40 345/589 |
| 2013/0286053 A1 * | 10/2013 | Fleck | G09G 3/3208 345/690 |
| 2014/0049537 A1 * | 2/2014 | Sahoo | G06T 19/006 345/419 |
| 2017/0255258 A1 | 9/2017 | Feiner et al. | |
| 2017/0301135 A1 | 10/2017 | Jagnow et al. | |
| 2017/0336863 A1 | 11/2017 | Tilton et al. | |

OTHER PUBLICATIONS

Fukiage et al., "Reduction of Contradictory Partial Occlusion in Mixed Reality by using Characteristics of Transparency Perception", International Symposium on Mixed and Augmented Reality, Nov. 5-8, 2012, Atlanta, Georgia, 11 pages.
International Search Report and Written Opinion for PCT/US2018/052944, dated Mar. 19, 2019, 17 pages.
Roxas et al., "Occlusion Handling using Semantic Segmentation and Visibility-Based Rendering for Mixed Reality", arXiv:1707v1, Jul. 30, 2017, 10 pages.

* cited by examiner

*Primary Examiner* — Martin Mushambo
(74) *Attorney, Agent, or Firm* — Dority & Manning, PA

(57) ABSTRACT

Systems and methods for rendering computer graphics using soft-occlusion are provided. A computing system can obtain display data for a virtual element to be displayed in association with imagery depicting an environment including a physical object. The computing system can generate a set of graphics occlusion parameters associated with rendering the image data and the display data based at least in a part on an estimated geometry of the physical object. The set of graphics occlusion parameters can define blending of the display data for the virtual element and the imagery at a soft-occlusion region that includes one or more locations within the estimated geometry. The computing system can render a composite image from the display data for the virtual element and the imagery based at least in part on the set of graphics occlusion parameters.

21 Claims, 10 Drawing Sheets

SOFT-OCCLUSION FOR COMPUTER GRAPHICS RENDERING

PRIORITY CLAIM

The present application is based upon and claims the right of priority to International Application No. PCT/US2018/052944, filed on Sep. 26, 2018, the disclosure of which is hereby incorporated by reference herein in its entirety for all purposes.

FIELD

The present disclosure relates generally to mapping applications that provide and/or display map data associated with a geographic area.

BACKGROUND

A geographic information system (GIS) is a system for archiving, retrieving, and manipulating data that has been stored and indexed according to the geographic coordinates of its elements. The system generally can utilize a variety of data types, such as imagery, maps, and tables. GIS technology can be integrated into Internet-based mapping applications.

Such mapping applications can be, or can otherwise be associated with, software applications that display interactive digital maps. For example, mapping applications may run on laptop and tablet computers, mobile phones, car navigation systems, hand-held global positioning system (GPS) units, etc. In general, a mapping application can display various types of geographic data including topographical data, street data, urban transit information, and traffic data. Further, the geographic data may be schematic or based on photography, such as satellite imagery. Still further, a mapping application can display the information in a two-dimensional (2D) or three-dimensional (3D) format.

More recently, mapping applications have incorporated virtual elements into displays of geographic information. Although some applications have incorporated virtual elements, integrating virtual elements in an effective manner remains a challenge.

SUMMARY

Aspects and advantages of embodiments of the present disclosure will be set forth in part in the following description, or may be learned from the description, or may be learned through practice of the embodiments.

One example aspect of the present disclosure is directed to a computing system for generating occlusion parameters for rendering computer graphics. The computing system comprises one or more image sensors, one or more processors, and one or more non-transitory, computer-readable media that store instructions that when executed by the one or more processors cause the computing system to perform operations. The operations comprise obtaining display data for a virtual element to be displayed by the computing system in association with imagery from the one or more image sensors. The imagery depicts an environment including a physical object. The operations comprise obtaining geometric data indicative of an estimated geometry of the physical object. The operations comprise generating, based at least in part on the estimated geometry of the physical object, a set of graphics occlusion parameters associated with rendering the image data and the display data. The set of graphics occlusion parameters define blending of the display data for the virtual element and the imagery at a soft-occlusion region that includes one or more locations within the estimated geometry associated with the physical object.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for providing map data for display in user interfaces.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
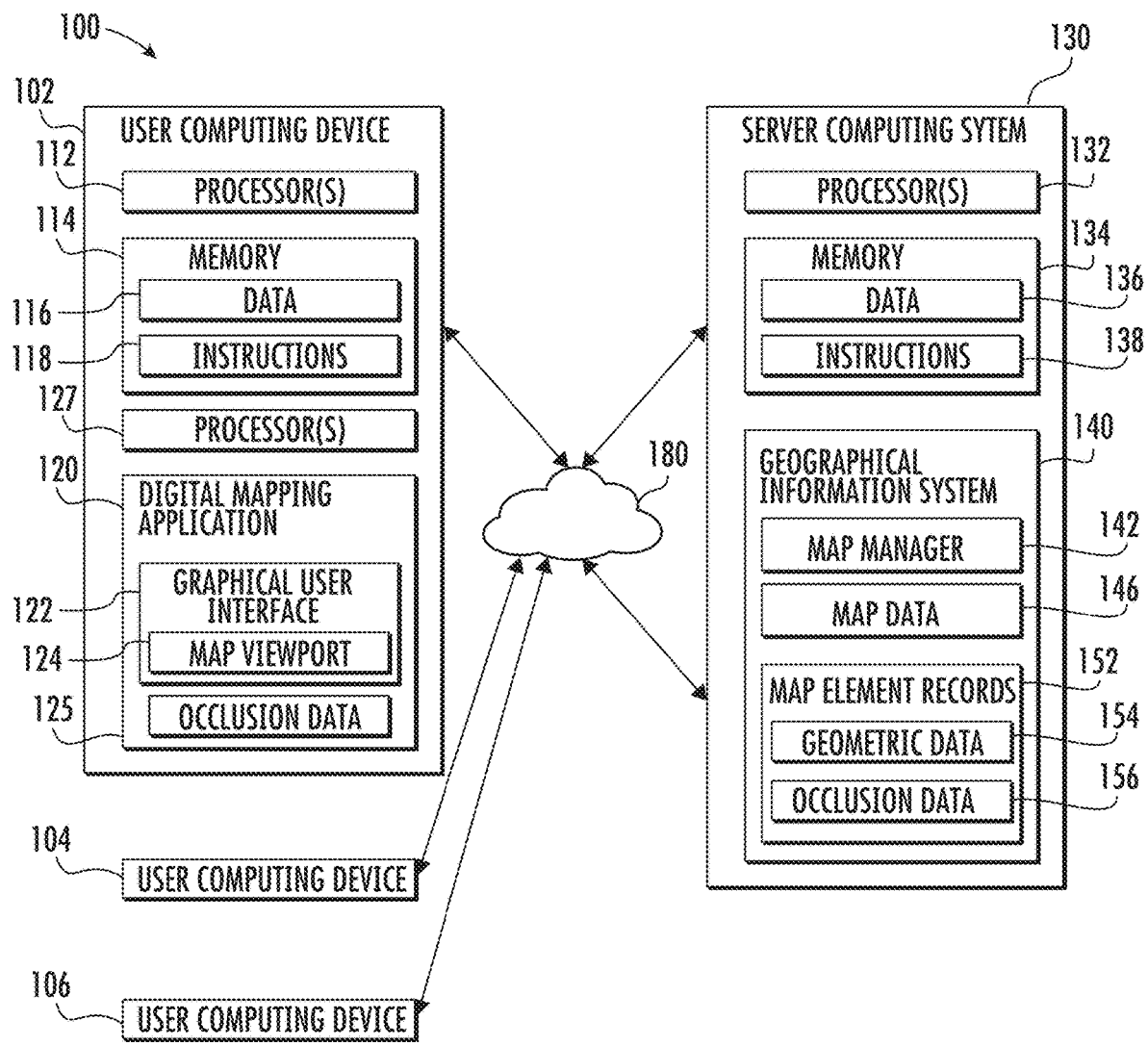
FIG. 1 depicts a block diagram of an example computing environment for generating and incorporating soft-occlusions for graphics rendering in accordance with example embodiments.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods for generating soft-occlusion data for physical objects and using the soft-occlusion data to render virtual elements relative to the physical objects in an augmented or virtual reality environment. More particularly, the disclosed technology provides a technique for generating occlusion parameters defining a soft-occlusion region in association with a physical object. A graphics processing system can render a composite scene that includes a joint render of display data for a virtual element and image data depicting a physical object within the soft-occlusion region. By way of example, soft-occlusion parameters can form an occluder for a graphics processing system that defines a soft-occlusion region relative to an edge of a physical object. The soft-occlusion parameters can define the soft-occlusion region as well as a blend of image data and display data for a virtual element.

In example embodiments, a soft-occlusion region may be generated based on modified geometric data associated with a physical object. The soft-occlusion region can include one or more locations within an estimated geometry associated with the physical object and/or one or more locations within an extended geometry that extends outward from the estimated geometry. Within the soft-occlusion region, a virtual element can be rendered along with image data depicting the physical object in the environment. One or more composite rendering techniques can be used for jointly rendering image data and display data for a virtual element within the soft-occlusion region. For instance, a technique can be used to blend image data and display data by selectively rendering a subset of pixels from display data for the virtual element and a subset of pixels from the image data. Such a technique can provide a screen-door effect where a virtual element appears to be partially, but not completely, obscured by the physical object within the soft-occlusion region. More particularly, the occluder for the soft-occlusion region can define a gradient that varies a concentration of pixels from the display data across the soft-occlusion region.

In some examples, a hard-occlusion region can be defined for at least a portion of the estimated geometry of the physical object. Within the hard-occlusion region, pixels associated with the display data can be discarded or otherwise masked such that the virtual element appears obscured by the physical object. In some implementations, a virtual element may be displayed with an altered appearance when in a hard-occlusion region.

Aspects of the present disclosure provide techniques for generating soft-occlusion regions in association with physical objects depicted in imagery of an environment. Within a soft-occlusion region of a composite image, display data for virtual elements and image data depicting the environment can be blended using one or more composite rendering techniques. A set of soft-occlusion parameters can be generated that define the soft-occlusion region relative to a physical object. The occlusion parameters can define an opacity gradient that varies across the soft-occlusion region. In example embodiments, the opacity gradient defines a variable concentration of display data for the virtual element at locations of the soft-occlusion region. For example, a higher concentration of display data for the virtual element may be included at a location adjacent to an edge associated with the physical object, relative to locations further from the edge for which a lower concentration of display data for the virtual element is included. The soft-occlusion region may include a plurality of bands, each defining a different concentration of display data for the virtual element. The concentration of display data in a given band can be greater than the concentration in any bands that are closer to an edge of the physical object. In this manner, a misalignment between the estimated geometry of an object and a depiction of the physical object in imagery can be masked or made less apparent in a composite scene. This can improve the ability of a virtual or augmented reality environment to integrate virtual elements into imagery of a real-world environment.

In accordance with some aspects of the present disclosure, a set of soft-occlusion parameters for a graphics processing system can define a soft-occlusion region that includes one or more locations within an estimated geometry associated with a physical object. Additionally, and/or alternatively, the soft-occlusion region can include one or more locations outside of the estimated geometry associated with a physical object. For instance, a soft-inclusion region may extend from at least one location within an estimated perimeter of a physical object to at least one location outside of the estimated perimeter. The system can obtain geometric data indicative of an estimated perimeter of the physical object. The system can modify the geometric data to determine a reduced geometry such as a reduced perimeter for the physical object. The system can generate one or more soft-occlusion regions based on the reduced perimeter. For instance, a soft-occlusion region can be defined that extends from an edge of the reduced geometry outward from the physical object. The soft-occlusion parameter(s) can define an opacity gradient across the soft-occlusion region to vary the amount of display data for the virtual element that is displayed. For example, a higher concentration of display data may be included for locations in the soft-inclusion region that are further from the edge, relative to locations that are closer to the edge.

In example embodiments, the system can determine a reduced geometry for a physical object by identifying one or more vertices of the outer dimension of the physical object as defined by the estimated geometric data. For each vertex, the system can determine an average normal for the set of faces adjacent to the vertex. The estimated geometry can then be reduced in size (e.g., moved inward) at each vertex in the direction of the average normal.

A set of "hard" edges from the reduced geometry can be identified at each vertex where an angle of adjacent faces satisfies a threshold. For instance, each vertex for which the adjacent faces are separated by more than a threshold angle (e.g., 10 degrees) can be identified as a "hard" or "convex" edge. The reduced geometry of the physical object can be extended at each hard edge. The extended geometry at an edge may be referred to as a fin that forms a soft-occlusion region. The fin can extend outward from the hard edge relative to the reduced geometry. In some examples, the fin extends outward a distance that is larger than the distance the corresponding vertex was moved inward as a result of reducing the geometry. In this manner, the fin may extend from within the estimated geometry to outside of the estimated geometry. As such, the soft-occlusion region may extend across the estimated perimeter of the physical object to potentially mask or obfuscate any misalignment between the location of the estimated perimeter from the geometric data and a visual depiction of the physical object in imagery.

Each fin can define a soft-occlusion region having an opacity gradient that decreases across the fin. For instance, the fin can define full occlusion at a location adjacent to the hard edge, and successively lower occlusion at locations of the fin that are further spaced from the hard edge. By way of example, the fin may define full occlusion at a location adjacent to the hard edge and no occlusion at a location furthest from the hard edge. A variable amount of occlusion can be defined by varying the concentration of display data for the virtual element according to the amount of indicated occlusion. For example, a larger number of pixels from the display data for the virtual element can be selected for lower occlusion areas in the fin and a smaller number of pixels can be selected for higher occlusion areas. A screen-door or other graphics processing technique can be used to specify the amount of display data for a virtual element that is included in a composite image. For example, a screen-door technique may use thresholds to determine whether to include or discard individual pixels of the display data when generating the composite image.

In accordance with some aspects of the present disclosure, the system can generate occlusion regions based on incomplete geometric data for physical objects. For example, the system can generate from incomplete geometric data for an object (e.g., building or other structure) additional geometric data representing an unknown geometry of the object. For instance, an estimated geometry can be analyzed to identify any missing portions of the estimated geometry. For example, some geometric data may specify data for vertical facades of a building without specifying data for the top or bottom of the building. The facade data can be used to compute geometric data for the missing portions of the estimated geometry. A normal for the missing portions of the estimated geometry can be determined and used to determine an adjusted normal for computing a direction for adding additional occlusion regions. In some examples, the normal can be factored into computing the average normal for determining a fin direction as earlier described.

After computing a normal that factors in the normals associated with the additional faces, additional occlusion regions can be defined. In some examples, the additional occlusion regions may be referred to as skirts that represent an additional geometry outside of the estimated geometry and/or reduced geometry for the physical object. Edges for the skirts and/or fins may be generated based on the average normal computed using the estimated geometry and the additional faces. In some examples, the skirt regions can be defined as soft-occlusion regions. A gradient may be defined for the skirt regions as earlier described. In some examples, the skirt regions can be defined as hard-occlusion regions.

Soft-occlusion regions may be defined using two-dimensional or three-dimensional representations. For example, a soft-occlusion region may be defined as a two-dimensional surface or plane in some examples. In such cases, a reduced geometry can be calculated that has a smaller area than the estimated geometry of the object. In another example, a soft-occlusion region may be defined as a three-dimensional volume. In such cases, a reduced geometry can be calculated that has a smaller volume than the estimated geometry for the object.

According to some examples, duplicated and/or co-located vertices present in geometric data for a physical object can be accommodated. For example, some objects may be represented by outlines derived from geometric data. In some instances, there may be duplicated, co-located vertices at the point of a loop closure for an outline. If an average normal is computed for duplicated vertices, the vertices may split when the geometry is reduced. According to some examples, co-located vertices can be identified and removed, either by a client device or server computing system. In another example, co-located vertices may be re-used when appropriate. Thus, by removing or re-using co-located vertices, the splitting of vertices and generation of misaligned occluders can be avoided.

In some cases, physical objects may cross node edges, such that the estimated geometry for the object may be split at a cell boundary. This may result in an extra soft-occlusion region being generated in the middle of a wall or other surface of an object. According to some examples, geometric data can be provided in semantically grouped portions rather than splitting objects and geometric data across node boundaries. In this manner, the generation of extra and/or misaligned occluders due to node edges can be avoided.

Geometric data indicative an estimated geometry of a physical object can be obtained in various ways. In some examples, geometric data may include a set of earth-centered, earth-fixed coordinates that define a physical object (e.g., building, road, geographic feature, body of water, etc.) location as a bounding box in a geographic region associated with a map. The bounding box may be representative of the perimeter of a building for example. The geometric data may be generated using various techniques and data sources, such as through an analysis of aerial imagery, satellite imagery, street-level imagery, etc. The analysis may be manual or computer-implemented. In some examples, one or more machine-learned models can be used to automatically generate geographic data associated with a building based on such imagery, etc. Alternatively or additionally, the geometric data can be manually added (e.g., through interaction with the geographic information service by an operator of the service or an owner of the building).

In accordance with some aspects of the disclosed technology, a client device can obtain geometric data from a remote computing device, such as a server operating a geographic information system. For instance, a client device may capture an image and/or location information and transmit it to the server. Based on the image (e.g., using feature recognition) and/or the location information, the server can localize the client device and provide geometric data for physical objects in the geographic area of the localized client device. The client device may generate a set of occlusion parameters including one or more soft-occlusion regions based on the geometric data from the server. Additionally, and/or alternatively, the client device may generate a set of occlusion parameters based on locally-determined geometric data, such as by using image recognition or other techniques associated with physical objects. The client device may continue to localize itself, for example, using on-board sensors, etc. The client device can obtain display data for a virtual element to be displayed in association with image data representing an environment including the physical object. The client device can render a composite scene from the display data and the image data based on the set of occlusion parameters. For instance, the occlusion parameter(s) can specify an amount of display data for the virtual element to be included in the composite scene at the one or more soft-occlusion regions.

In accordance with some aspects of the disclosed technology, a server computing system can provide occlusion data in response to requests from client devices. For instance, a client device can issue one or more requests for geographic information associated with a geographic area. The server can localize a client device based on imagery and/or location information received from the client device. In response to the user request, the server can transmit occlusion data to the client device. The occlusion data can specify one or more soft-occlusion regions that extend from one or more locations inside an estimated outer dimension of the physical object as derived from geometric data to one or more locations outside of the estimated outer dimension.

Additional graphics processing can be combined with the soft-occlusion regions to further enhance a visual depiction of virtual elements in combination with imagery of an environment including physical objects. For instance, a visual appearance of a virtual element can be modified based on a location of the virtual element relative to a physical object. In an example, a hard-occlusion region can be defined that includes at least a portion of locations within an estimated geometry of a physical object. The hard-occlusion region can include one or more locations associated with a reduced geometry of the physical object, for example. One or more soft-occlusion regions can also be defined that extend from one or more locations within the estimated geometry to one or more locations outside of the estimated geometry. Outside of the soft-occlusion and hard-occlusion regions, the virtual element can have a first base appearance and can be displayed in a non-occluded form. Within the soft-occlusion region, the virtual element can have the first base appearance and be displayed with soft-occlusion. Within the hard-occlusion region, the virtual element can be displayed with a second base appearance. In this manner, the virtual element can be visible when present in a location occluded by the physical object. Such a technique may be referred to as an x-ray vision technique since it may appear to a user that they are able to see through a physical object in the composite image. Other techniques may be used to provide visual depictions of virtual elements when in a hard-occlusion region.

The systems and methods of the present disclosure can provide a number of technical effects and benefits. As an example, various implementations address the technical problem of how to integrate virtual elements with real-world imagery. By generating soft-occlusion regions for physical objects, alignment issues resulting from differences in the geometric data and image data associated with a physical object may be reduced. Such misalignments may typically cause virtual elements to appear on top of physical objects in a composite image, or to be occluded at locations that do not correspond to the physical object in the composite image. The utilization of a modified geometry for physical objects as described herein can compensate for such misalignments. The generation of a reduced geometry and extended geometry for the soft-occlusion regions can reduce alignment issues which may otherwise arise between physical objects and virtual elements. More particularly, a soft-occlusion region for a physical object may be defined based on estimated geometric data. The soft-occlusion region can extend from one or more locations inside an estimated perimeter of the physical object to one or more locations outside the estimated perimeter. In this manner, a misaligned edge in the geometric data for the physical object can be obfuscated by the soft-occlusion region.

In addition, an occlusion region can be generated based on incomplete geometric data for a physical object. An occlusion region can be generated based on one or more simulated faces generated at an open edge having a missing adjacent face. Open edges in geometric data can be identified and an average normal calculated from adjacent faces identified in the geometric data and simulated faces generated from the incomplete geometric data. With an average normal calculated, additional occlusion regions can be generated that compensate for the incomplete geometric data. In this manner, a virtual element can be rendered with proper occlusion in situations where geometric data for a physical object is incomplete.

Generating occlusion data based on geometric data for physical objects depicted in imagery provides further technical effects and benefits. For example, processing time can be reduced by alleviating the requirements associated with traditional frame-based rendering of occlusions. By computing a soft-occlusion region based on geometric data, a frame-by-frame rendering of an occluder can be avoided. The soft-occlusion region can be computed once at a client device for example, and then used to render multiple frames of image data including at least a portion of the soft-occlusion region. Such a technique can avoid processing overhead that may typically be incurred when calculating occlusions in graphics processing. For example, no additional render-pass or post-processing may be required in example embodiments.

In some implementations, in order to obtain the benefits of the techniques described herein, the user may be required to allow the collection and analysis of location information associated with the user or her device. For example, in some implementations, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed. As an example, a computing system can obtain real-time location data which can indicate a location, without identifying any particular user(s) or particular user computing device(s).

With reference now to the figures, example aspects of the present disclosure will be discussed in greater detail.

FIG. 1 depicts a block diagram of an example computing environment 100 in which embodiments of the present disclosure may be practiced for generating and utilizing soft-occlusion data for rendering virtual elements in association with imagery. The environment 100 can be implemented using a client-server architecture that includes a server computing system 130 that communicates with one or more user computing devices 102, 104, 106 (e.g., client devices) over a network 180. The environment 100 can be implemented using other suitable architectures, such as a single computing device or additional computing devices.

The environment 100 includes a server computing system 130, such as a web server and/or application server, etc. The server computing system 130 can host a geographic information system 140, such as a geographic information system associated with a mapping service. The server computing system 130 can be implemented using any suitable computing device(s). The server computing system 130 can have one or more processors 132 and one or more memory devices 134. The server computing system 130 can also include a network interface used to communicate with one or more user computing devices over the network 180. The network interface can include any suitable components for interfacing with one more networks, including for example, transmitters, receivers, ports, controllers, antennas, or other suitable components.

The one or more processors 132 can include any suitable processing device, such as a microprocessor, microcontroller, integrated circuit, logic device, or other suitable processing device. The one or more memory devices 134 can include one or more computer-readable media, including, but not limited to, non-transitory computer-readable media, RAM, ROM, hard drives, flash drives, or other memory devices. The one or more memory devices 134 can store information accessible by the one or more processors 132, including computer-readable instructions 138 that can be executed by the one or more processors 132. The instructions 138 can be any set of instructions that when executed by the one or more processors 132, cause the one or more processors 132 to perform operations. For instance, the instructions 138 can be executed by the one or more processors 132 to implement a map manager 142. Thus, although shown separately from instructions 138, map manager 142 may be included in the memory 134 as instructions 138.

As shown in FIG. 1, the one or more memory devices 134 can also store data 136 that can be retrieved, manipulated, created, or stored by the one or more processors 132. The data 136 can include, for instance, map data 146 and/or map element records 152. The data 136 can be stored in one or more databases. The one or more databases can be connected to the server computing system 130 by a high bandwidth LAN or WAN, or can also be connected to server computing system 130 through network 180. The one or more databases can be split up so that they are located in multiple locales.

Server computing system 130 can exchange data with one or more client devices such as user computing devices 102, 104, 106. User computing devices 102, 104, 106 are one example of a communication device. Although three client devices are illustrated in FIG. 1, any number of client devices can be connected to the server computing system 130 over the network 180. Each of the client devices can be any suitable type of computing device, such as a general purpose computer, special purpose computer, laptop, desktop, mobile device, navigation system, smartphone, tablet, wearable computing device, a display with one or more processors, or other suitable computing device.

Similar to the server computing system 130, a user computing device 102, 104, 106 can include one or more processor(s) 112 and a memory 114. The one or more processor(s) 112 can include one or more central processing units (CPUs), graphics processing units (GPUs) dedicated to efficiently rendering images or performing other specialized calculations, and/or other processing devices. The memory 114 can include one or more computer-readable media and can store information accessible by the one or more processors 112, including instructions 118 that can be executed by the one or more processors 112 and data 116. For instance, the memory 114 can store instructions 118 for implementing a digital mapping application 120 for displaying map data and other data determined according to example aspects of the present disclosure.

The user computing devices of FIG. 1 can include various input/output devices for providing and receiving information from a user, such as a touch screen, touch pad, data entry keys, speakers, and/or a microphone suitable for voice recognition. For instance, the user computing devices can have a display device for presenting a graphical user interface 122 displaying that data and other data within a map viewport 124 according to example aspects of the present disclosure.

The user computing devices can also include a network interface used to communicate with one or more remote computing devices (e.g. server computing system 130) over the network 180. The network interface can include any suitable components for interfacing with one more networks, including for example, transmitters, receivers, ports, controllers, antennas, or other suitable components.

The network 180 can be any type of communications network, such as a local area network (e.g. intranet), wide area network (e.g. Internet), cellular network, or some combination thereof. The network 180 can also include a direct connection between a user computing device 102, 104, 106 and the server computing system 130. In general, communication between the server computing system 130 and a user computing device 102, 104, 106 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Server computing system 130 can host a geographic information system (GIS) 140. The GIS 140 can implement a mapping application, a virtual globe application, or any other suitable GIS. The GIS 140 can provide for the archiving, retrieving, and manipulation of geospatial data that has been indexed and stored according to geographic coordinates, such as latitude, longitude, and altitude coordinates, associated with the geospatial data. The GIS 140 can combine satellite imagery, photographs, maps, models, and other geographic data, and Internet search capability so as to enable a user to view imagery of the planet (e.g. map data associated with a plurality of geographic areas) and related geographic information (e.g., locales such as islands and cities, and points of interest such as local restaurants, hospitals, parks, hotels, and schools). The GIS 140 further allows a user to conduct local searches, to get travel directions to a location or between two locations, or to otherwise retrieve map data for a selected region. The user can virtually fly from space (e.g., some vantage point above the Earth) to and around an entered target address or location, such as a neighborhood or other area of interest. Results can be displayed in a two-dimensional or three-dimensional representation of the area of interest. In some the user can pan, tilt, and rotate the view to see three-dimensional terrain and buildings.

The GIS 140 can further allow a user to annotate maps, and/or enable data layers to show, for example, parks, schools, hospitals, airports, shopping, and other points of interest or locales. The GIS 140 can further allow the user to layer multiple searches, save results to folders, and share search results and maps with others.

The geographic information system 140 can include a map manager 142 configured to manage map data and/or map element records 152. Map manager 142 can determine map data to display with a map associated with a geographic area such as a user selected region. For instance, the geographic area can be a geographic area to be displayed within a viewport of the digital mapping application 120 on the user computing device 102. In some implementations, the user can select the geographic area through an interaction with the digital mapping application 120. Map element records 152 can include data describing the location and physical attributes of physical objects corresponding to map elements, such as buildings, roads, geographic features, bodies of water, etc. Map element records 152 may include geometric data 154 describing physical attributes and/or location data associated with map elements. Geometric data may include data indicative of the outer dimensions or perimeter of a building or other structure. Geometric data may include a set of earth-centered, earth-fixed coordinates that define the structure as a bounding box in a geographic area associated with a map. The bounding box may be representative of the perimeter of a building for example. The geometric data may be generated using various techniques and data sources, such as through an analysis of aerial imagery, satellite imagery, street-level imagery, etc. The analysis may be manual or computer-implemented. In some examples, one or more machine-learned models can be used to automatically generate geographic data associated with a structure based on such imagery, etc. Alternatively or additionally, the geometric data can be manually added (e.g., through interaction with the geographic information service by an operator of the service or an owner of the building).

Digital mapping application 120 may include a geospatial browser or other suitable viewer that provides an interface between the user computing device 102 and the GIS 140. For instance, the digital mapping application can be configured to display digital map data within a map viewport 124 of a graphical user interface 122. A user of the user computing device 106 can interact with the digital mapping application 120 using graphical user interface 122 to facilitate interactions between the user computing device 102 and the GIS 140. The digital mapping application can provide a user interface for viewing geographic data (e.g. digital map data). The graphical user interface can include a plurality of user interface elements with which the user can interact to facilitate communications between the user computing device 102 and the GIS 140.

The digital mapping application 120 can be configured to display a map view of a geographic area including a selected region of a mapped region. As indicated, such map view can facilitate an intuitive user experience for a user viewing the digital mapping application 120. In this manner, the user computing device 102 can communicate with the GIS 140 to facilitate a provision of the map view to the user.

In some embodiments, the digital mapping application 120 can be configured to display imagery of an environment associated with a geographic area, such as a display of one or more images based on image data from one or more sensors 127 (e.g., camera). The digital mapping application 120 can additionally display virtual elements in association with the imagery of a geographic area. Virtual elements can include any type of virtual graphic such as an indication of a map element (e.g., building, street, geographic feature) in the imagery, an indication of additional data (e.g., metadata) associated with a map elements, directional signals associated with routing, arbitrary synthetic elements, etc. The digital mapping application can render display data for a virtual element along with image data to create an augmented or virtual-reality environment.

In accordance with example embodiments, map manager 142 may provide geometric data 154 to a user computing device 102, 104, 106 for occlusion processing at the client device. A user computing device can generate occlusion data 125 including occlusion parameters for rendering virtual objects relative to physical objects depicted in imagery. For instance, a user computing device may capture an image and transmit it to GIS 140. Additionally, and/or alternatively, the user computing device may transmit location information such as GPS coordinates. Based on the image (e.g., using feature recognition) and/or the location information, the server can localize the client device and provide geometric data for physical objects in the geographic area of the localized client device.

The user computing device may then render virtual objects in imagery of a geographic area based at least in part on the geometric data. More particularly, the user computing device can generate one or more occlusion parameters for rendering virtual elements relative to depictions of physical objects in digital imagery. The occlusion parameters can form a graphics occluder that is used to determine whether a pixel or other portion of a virtual element should be displayed or discarded when rendering a composite image.

In some embodiments, map manager 142 can optionally generate and store occlusion data 156 including occlusion parameters at server computing system 130. Map manager 142 may provide occlusion data in response to requests form the user computing device. In such examples, a user computing device can transmit location information and/or image data to GIS 140. Map manger 142 can determine occlusion data 156 associated with one or more physical objects in the geographic area of the localized client device. Map manager 142 can transmit the occlusion data 156 to the requesting user computing device. The occlusion data can include occlusion parameters specifying one or more soft-occlusion regions. The user computing device can directly use the occlusion parameters when rendering virtual elements with imagery of a geographic area corresponding to the occlusion parameters.

Figure 2:
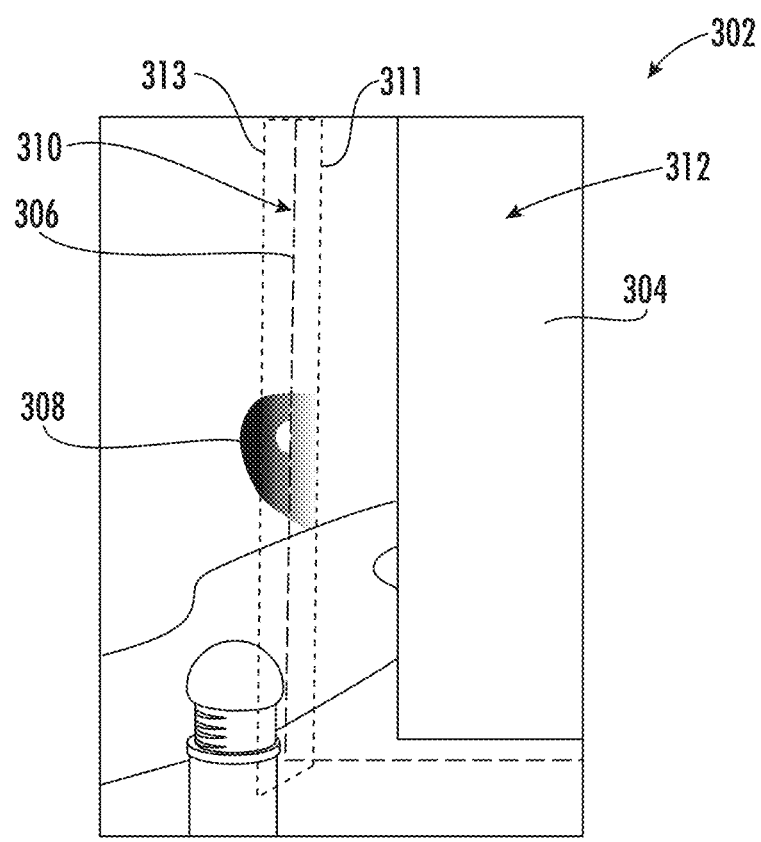
FIG. 2 depicts a graphical diagram of an example composite render of image data of an environment and display data of a virtual element using a soft-occlusion region in accordance with example embodiments.

FIG. 2 depicts a graphical diagram of an example composite render of image data of an environment and display data of a virtual element using a soft-occlusion region in accordance with example embodiments. FIG. 2 depicts a composite image 302 that can be rendered by a user computing device 102 from image data depicting physical object 304 and display data for virtual element 308. An estimated geometry 306 of a physical object 304 as defined by geometric data is depicted. The estimated geometry of object 304 may be an estimated outer dimension or estimated perimeter associated with object 304 in example embodiments. As FIG. 2 illustrates, the estimated geometry 306 includes a misalignment with the actual location of object 304 as depicted in composite image 302.

The estimated geometry 306 can be used to define a hard-occlusion region 314 in association with object 304. The hard-occlusion region includes locations within the estimated geometry 306 depicted in FIG. 2. Hard-occlusion parameters can specify locations where virtual elements will not be rendered if their depth value, such as can be specified in a depth buffer, is greater than that of a corresponding location of the hard-occlusion region. In this case, the hard-occlusion region encompasses the actual location of object 304 as well as additional locations in the composite image 302 that do not correspond to object 304. The hard-occlusion region is defined based on the estimated geometry 306 which has a misalignment with the actual location of object 304. As such, the hard-occlusion region 312 is misaligned from the object 304 which it represents.

Embodiments of the disclosed technology provide a soft-occlusion region defined by geometric data in order to alleviate or otherwise compensate for misalignments between geometric data and image data representing objects in an environment of a geographic area. One or more soft-occlusion parameters can define a soft-occlusion region where one or more rendering techniques are used to blend display data associated with a virtual element and image data depicting an object. The image data and display data can be jointly rendered within the soft-occlusion region in an effort to obfuscate misalignments between geometric data and image data.

One or more soft-occlusion parameters are used to define a soft-occlusion region 310 where virtual element 308 is selectively rendered by blending with image data of the environment. In example embodiments, the display data for the virtual element can be rendered using an opacity gradient. Soft-occlusion region 310 is located proximate to an edge of object 304 as represented by the estimated geometry 306 for object 304. In this example, soft-occlusion region 310 extends from an area within the estimated geometry 306 of object 304 at boundary 311 to an area outside of the estimated geometry 306 at boundary 313. As will be described in more detail hereinafter, soft-occlusion region 310 can extend from a first edge of object 304 as derived from reduced geometric data for the physical object 304 at a direction based on a calculated normal associated with the edge. The soft-occlusion region can extend outward to a boundary 313 as derived from extended geometric data for the physical object 304. In another example, a soft-inclusion region may include one or more locations within an estimated geometry associated with a physical object without extending to locations outside of the estimated geometry. In yet another example, a soft-inclusion region may include one or more locations within an extended geometry associated with a physical object without extending to locations within an estimated geometry.

Within soft-occlusion region 310, display data for virtual elements and image data depicting the environment can be blended using various composite rendering techniques. One or more soft-occlusion parameters can define a blending of display data with image data within the soft-occlusion region. The soft-occlusion parameter(s) can define a concentration or amount of display data to be included at individual locations or other portions of the soft-occlusion region. As illustrated in FIG. 2, the concentration of display data for virtual element 308 varies across the soft-occlusion region 310. At an inner boundary 311 of the soft-occlusion region, the concentration of display data is low, whereas at an outer boundary 313, the concentration of display data is higher. In some examples, the concentration of display data at the inner boundary can be 0% or fully occluded whereas the concentration of display data at the outer boundary can be 100% or fully non-occluded. Between the boundary edge and the outer boundary, the concentration of display data can vary between the percentages at the boundaries.

The soft-occlusion region may include a plurality of bands, each defining a different concentration of display data for the virtual element. For example, sixteen bands can be defined, although any number of bands may be used. The concentration of display data in a given band can be greater than the concentration in any band closer to the inner boundary 311 of the soft-occlusion region. In this manner, a misalignment between the estimated geometry of an object and a depiction of the physical object in imagery can be masked or made less apparent in a composite scene. This can improve the ability of a virtual or augmented reality environment to integrate virtual elements into imagery of a real-world environment.

A hard-occlusion region 312 is defined that is associated with at least a portion of the reduced geometry. More particularly, hard-occlusion region 312 is defined to include locations within the reduced geometry defined by inner boundary 311.

Figure 3:
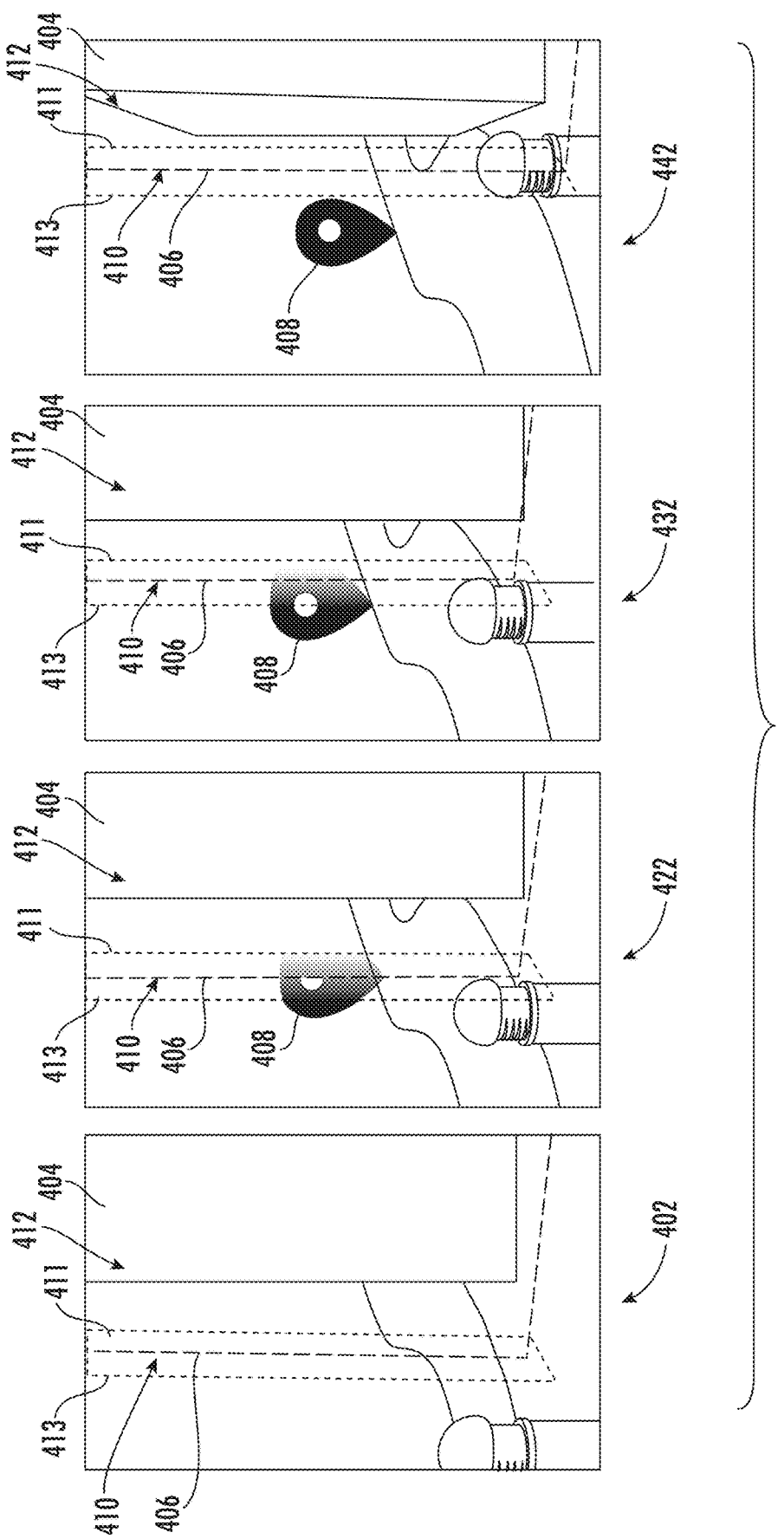
FIG. 3 depicts a graphical diagram of a sequence of example composite renders of image data of an environment and display data of a virtual element using a soft-occlusion region in accordance with example embodiments.

FIG. 3 depicts a graphical diagram of a sequence of example composite renders of image data of an environment and display data of a virtual element using a soft-occlusion region in accordance with example embodiments. FIG. 3 depicts a sequence of composite images 402, 422, 432, 442 as may be captured from a video sequence or sequence of still images in which the perspective changes throughout the sequence, resulting in a change of location of a physical object 404 relative to the depicted environment.

An estimated geometry 406 of physical object 404 as defined by geometric data is depicted relative to each composite image. One or more soft-occlusion parameters are used to define a soft-occlusion region 410 and blending of the display data for the virtual element and the image data at one or more locations associated with the soft-occlusion region. One or more hard-occlusion parameters are used to define a hard-occlusion region 412 where virtual element 408 is fully occluded based on a rendered depth value greater than that of the occlusion data. The hard-occlusion region 412 is defined to include locations within the reduced geometry defined by inner boundary 411.

In composite image 402, a location of virtual element 408 is fully within the hard-occlusion region 412. Accordingly, the composite image 402 depicts image data for the geographic area without rendering display data for virtual element 408. In composite image 422, however, the perspective is altered such that location of virtual element 408 within the composite image is no longer within the hard-occlusion region. More particularly, virtual element 408 is located partially within soft-occlusion region 410 and partially outside of soft-occlusion region 410 and hard-occlusion region 412. In locations outside of soft-occlusion region 410 and hard-occlusion region 412, virtual element 408 is fully rendered with no occlusion. Within soft-occlusion region 410, virtual element 408 is rendered by blending image data of the environment with display data for the virtual element. In this example, an opacity gradient defines a variable blending of display data for the virtual element across the soft-occlusion region. Virtual element 408 is more fully rendered at locations adjacent an outer boundary 413 relative to locations adjacent an inner boundary 411. Between the boundaries, the concentration of display data varies such that the virtual element appears to be more fully rendered at locations further from the inner boundary 411.

In composite image 432, the perspective is further altered such that virtual element 408 is positioned more fully within the non-occluded region and less within the soft-occlusion region 410. Again, virtual element 408 is fully rendered at locations outside of the soft-occlusion region and hard-occlusion region. Within soft-occlusion region 410, virtual element 408 is rendered using the opacity gradient to provide a variable concentration of display data for the virtual element across the soft-occlusion region. Finally, in composite image 442 the perspective is altered again such that virtual element 408 is positioned outside of soft-occlusion region 410 and hard-occlusion region 412. Accordingly virtual element 408 is fully rendered within the non-occluded region.

Figure 4:
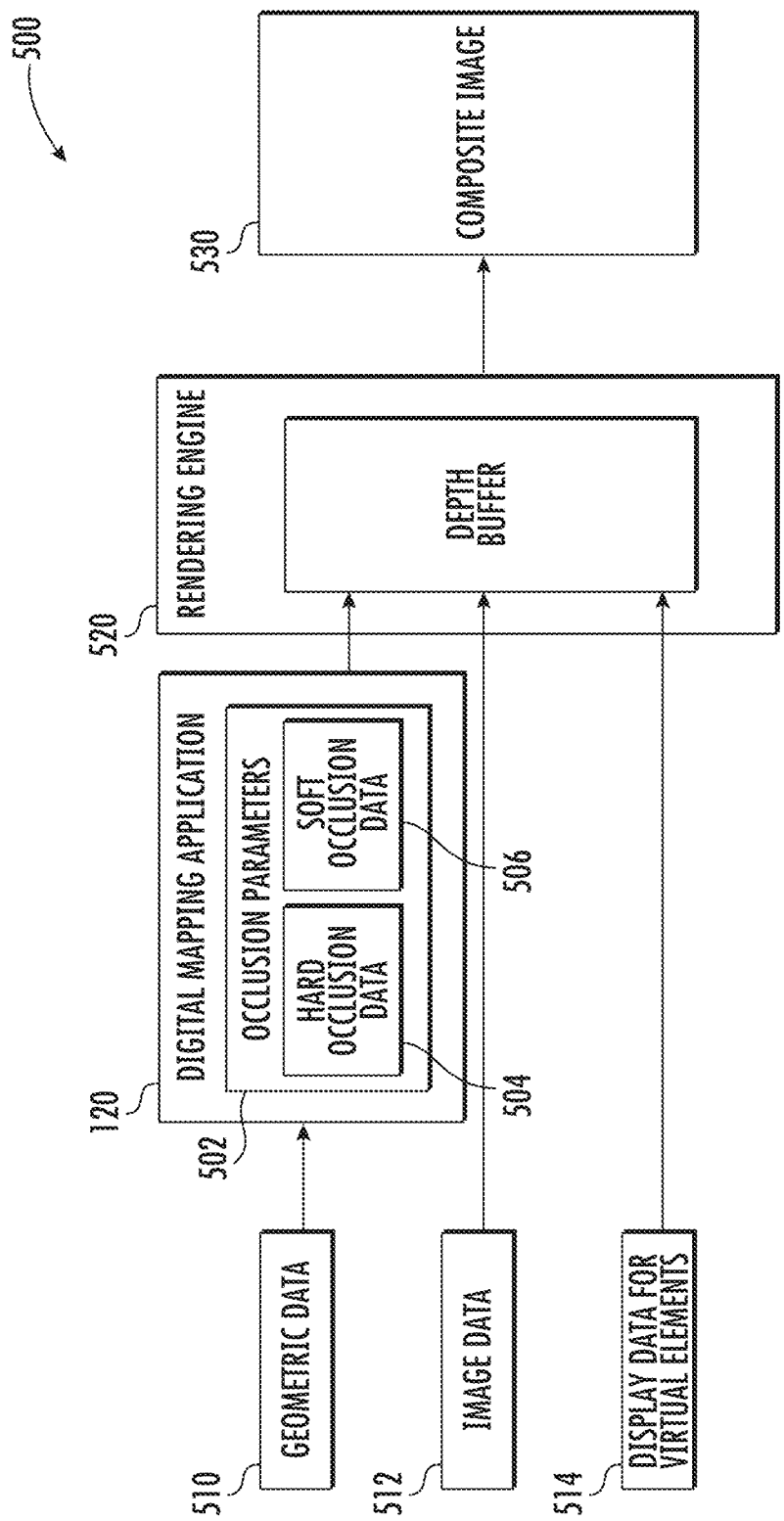
FIG. 4 depicts a block diagram of an example computing environment for rendering a composite image using soft-occlusion in accordance with example embodiments.

FIG. 4 depicts a block diagram of an example computing environment 500 illustrating the generation of occlusion parameters for rendering virtual elements with imagery of an environment in accordance with example embodiments. Computing environment 500 includes a digital mapping application 120 as depicted in FIG. 1 and a rendering engine 520. Rendering engine 520 can be implemented by a user computing device 102, 104, 106.

Digital mapping application 120 obtains geometric data 510 and generates one or more occlusion parameters 502 including hard-occlusion data 504 and soft-occlusion data 506. The soft-occlusion data 506 can define one or more soft-occlusion regions based on modified geometric data associated with a physical object. A soft-occlusion region can include a portion of an estimated geometry associated with the physical object and/or an extended geometry that extends outward from the estimated geometry. One or more composite rendering techniques can be used for jointly rendering image data within the soft-occlusion region.

The hard-occlusion data 504 can define one or more hard-occlusion regions for at least a portion of the estimated geometry of a physical object. In some examples, one or more hard-occlusion regions can be defined based on a reduced geometry as determined from an estimated geometry associated with the physical object. Within the hard-occlusion region, pixels associated with the display data can be discarded or otherwise masked such that the virtual element appears obscured by the physical object. In some implementations, a hard-occlusion parameter can specify that a virtual element is displayed with an altered appearance in a hard-occlusion region.

Soft-occlusion data 506 and hard-occlusion data 508 can be provided to depth buffer 522 (e.g., z-buffer) of rendering engine 520. Additionally, image data 512, such as can be obtained from the output of one or more image sensors of a user computing device can be provided to depth buffer 522. Display data 514 for one or more virtual elements can also be provided to depth buffer 522. Rendering engine 520 can generate a composite image 530 based on blending image data 512 and display data 514. More particularly, rendering engine 520 can render a composite image 530 by blending image data and display data based at least in part on one or occlusion parameters 502 indicated by hard-occlusion data 504 and/or soft-occlusion data 506. In example embodiments, each pixel of image data 512, display data 514, and hard-occlusion data 504 and/or soft-occlusion data 506 can be associated with the depth value. The depth values can be used to determine whether to render image data or display data for a given pixel location in the final composite image 530. For instance, within a hard-occlusion region, image data 512 can be rendered when a depth value associated with the image data is less than a depth value associated with the display data 514 for a corresponding pixel. When the depth value for the display data is less than that of the image data, the display data for the virtual element can be rendered.

Within the soft-occlusion region, the display data for the virtual element can be combined with image data of an environment using one or more composite rendering techniques. For example, a first subset of pixels from the display data for the virtual element can be rendered while a second subset of pixels from the image data is rendered. In example embodiments, a screen door technique can be used to determine whether a pixel from the display data is discarded or rendered in the final composite image 530. Rendering engine 520 can implement a shader to selectively render a subset of pixels from the display data while discarding some pixels. In example embodiments, a shader can index into a pixel mask and utilize a mapping to determine whether an individual pixel of the display data is rendered in the composite image 530. Thresholding can be used in example embodiments to compare individual pixel values to a threshold to determine whether the pixel is rendered in a composite image. In example embodiments, an occluder for a soft-occlusion region can be rendered before display data for the virtual elements. In some examples, rather than discard pixel data, a different or altered representation of a virtual element can be rendered to convey that the virtual element is occluded. A shader within rendering engine 520 can be used to alter the visual appearance of the virtual element when in a hard-occlusion region, such as to provide an x-ray vision effect.

In some examples, rendering engine 520 can implement an opacity gradient for a soft-occlusion region. An opacity gradient can be defined that specifies a larger amount of display data for rendering within some locations of a soft-occlusion region compared to other locations within a soft-occlusion region. A higher concentration of display data may be selected for locations closer to a non-occluded region, whereas lower concentrations of display data for virtual elements may be rendered at locations closer to the hard-occlusion region. For example, an edge of a reduced geometry determined for a physical object can be identified. A soft-occlusion region can be generated that extends from the identified edge outward from the reduced geometry. The opacity gradient can define a variable amount of display data for locations within the soft-occlusion region relative to the edge. For example, the soft-occlusion region can include a first end adjacent to the identified edge and a second end distal from the first end. The opacity gradient can define a larger amount of display data for the virtual element at the second end and a smaller amount of display data for the virtual element at the first end. By way of example, the opacity gradient can define full occlusion at the first end so the virtual element is completely masked, and non-occlusion at the second end so the virtual element is fully rendered. Between the first end and second end the opacity gradient can increase the concentration of display data to increase the appearance of the virtual element as locations spaced further from the physical object. In some examples, rendering engine 520 can implement noise to provide non-uniformity of the opacity gradient across the soft-occlusion region.

Figure 5:
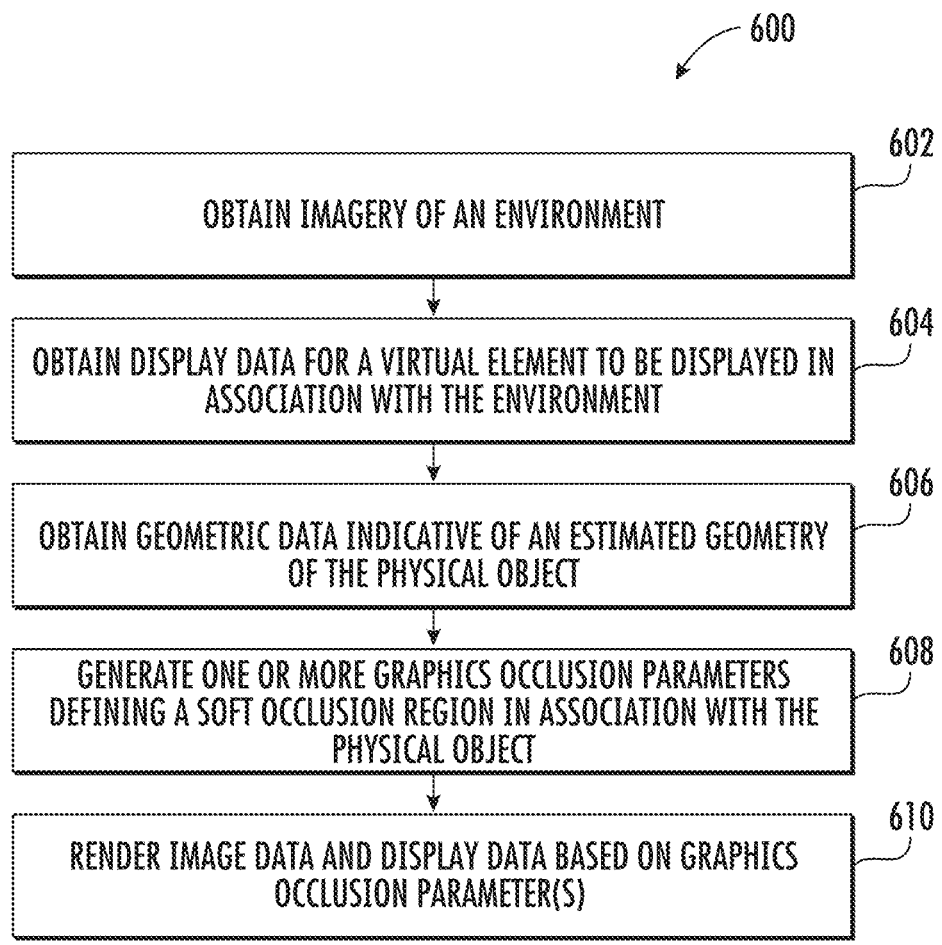
FIG. 5 is a flowchart depicting an example method of generating a composite render of image data of an environment and display data of a virtual element using a soft-occlusion region in accordance with example embodiments.

FIG. 5 is a flowchart depicting an example method 600 of rendering the composite image in accordance with example embodiments. One or more portions of method 600 can be implemented by one or more computing devices such as, for example, server computing system 130 or a user computing device 102, 104, 106, as depicted in FIG. 1. One or more portions of the method 600 described herein can be implemented as an algorithm on the hardware components of the devices described herein (e.g., as in FIG. 1) to, for example, generate occlusion parameters for a physical object and render an image using the occlusion parameters. In example embodiments, method 600 may be performed by a map manager 142 of server computing system 130. Although FIG. 5 depicts steps performed in a particular order for purposes of illustration and discussion, method 600 of FIG. 5 and the other methods (e.g., method 700) described hereinafter are not limited to the particularly illustrated order or arrangement. The various steps of the methods disclosed herein can be omitted, rearranged, combined, and/or adapted in various ways without deviating from the scope of the present disclosure.

At (602), imagery of an environment is obtained. In example embodiments, the imagery may be obtained from an output of one or more sensors of the user computing device 102, 104, 106. For instance, the user computing device may obtain image data including one or more digital images such as individual photos or a video including multiple images.

At (604), display data for a virtual element to be displayed in association with the environment depicted in the imagery is obtained. Virtual elements may include any graphical representation including arbitrary graphical elements and/or graphical elements associated with map elements or physical objects depicted in the environment. By way of example, a virtual element may be provided in association with a physical object such as a building or business location to provide information relevant to the physical object. As another example, a virtual element may be a navigation element such as a pin designating a geographic location or any other identifier associated with mapping, routing, and/or navigation processes, etc.

At (606), geometric data indicative of an estimated geometry of the physical object is obtained. By way of example, the geometric data may include polygonal data that defines at least a portion of the perimeter or outer dimension of a building or other structure. In some examples, the polygonal data defines less than all of the outer dimensions of the structure. The polygonal data may include latitude/longitude coordinates, earth-centered earth-fixed coordinates, World Geodetic System coordinates, or other suitable coordinates that describe the perimeter or outer dimension of the structure.

At (608), one or more graphics occlusion parameters defining the soft-occlusion region in association with the physical object are generated. The occlusion parameters can be associated with at least one edge of the physical object in some examples. The one or soft-occlusion regions can define a blended rendering of image data depicting an environment and display data for a virtual element to be rendered relative to the environment. The soft-occlusion region(s) can be associated with a physical object depicted in the image data. In some examples, the one or more occlusion parameters can define an amount of display data for a virtual element to be included within the soft-occlusion region. The one or more occlusion parameters can define an amount of display data for individual locations within the soft-occlusion region in some examples. For instance, the occlusion parameters can define a plurality of bands for a soft-occlusion region. Within each band, a different concentration of display data can be defined. In some examples, noise can be introduced to avoid the appearance of the bands in a rendered composite image. For instance, noise can be introduced to provide a non-uniform distribution of display data, such as at the boundaries between bands. The one or more soft-occlusion parameters may specify an opacity gradient in some examples.

At (610), the image data and display data are rendered based on the one or more graphics occlusion parameters generated at 608. Various processes can be used to render the image data and display data based on one or more occlusion parameters. For example, occlusion data can be rendered using a depth buffer prior to rendering display data for virtual elements in some examples. A shader may use a pixel mask for indexing to generate a screen door transparency for the virtual element based on combining the display data at particular pixel locations.

Figure 6:
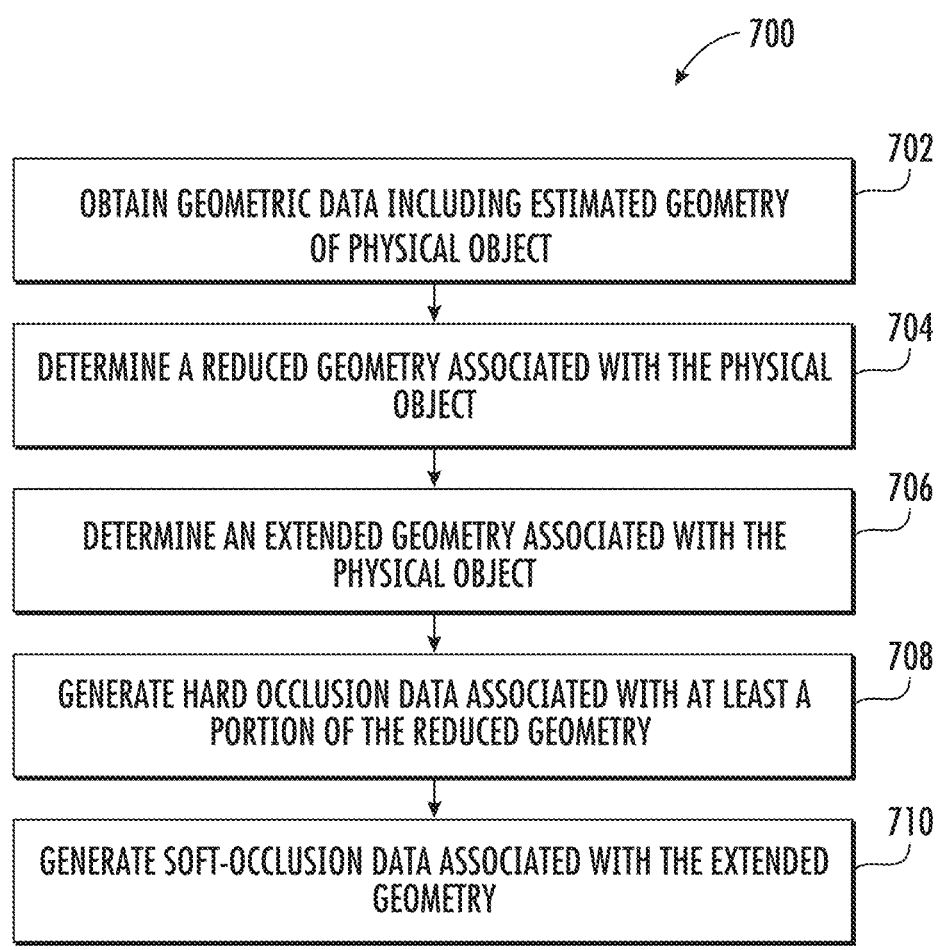
FIG. 6 is a flowchart depicting an example method of generating soft-occlusion data based on an estimated geometry of a physical object in accordance with example embodiments.

FIG. 6 is a flowchart depicting an example method 700 of generating soft-occlusion data based on data indicative of data for a modified geometry for a physical object. One or more portions of method 700 can be implemented by one or more computing devices such as, for example, server computing system 130 or a user computing device 102, 104, 106, as depicted in FIG. 1. One or more portions of the method 700 described herein can be implemented as an algorithm on the hardware components of the devices described herein (e.g., as in FIG. 1) to, for example, generate a set of soft-occlusion parameters. In example embodiments, method 700 may be performed by a map manager 144 of server computing system 130. Method 700 can be performed at 608 of method 600 in some examples.

At (702), geometric data including an estimated geometry of a physical object is obtained. At (704), a reduced geometry associated with the physical object is determined from the estimated geometry obtained at 702. Various techniques may be used for generating a reduced geometry based on an estimated geometry. Generally, the reduced geometry is less than or smaller than the estimated geometry. The reduced geometry may be generated by reducing a dimension associated with one or more portions of the estimated geometry. A two-dimensional or three-dimensional reduction in geometry may be utilized at 704. In some examples, one or more edges or vertices from an estimated geometry are identified. The geometry can be reduced by reducing a dimension of faces or surfaces adjacent to an identified vertex. An average normal for adjacent faces can be computed in some examples and the reduction in dimension size performed in the direction of the average normal.

At (706), an extended geometry associated with the physical object is determined from the reduced geometry and/or estimated geometry. Various techniques may be used for generating an extended geometry. For instance, a subset of edges of the reduced geometry can be identified. The subset of edges may be hard, convex edges that are identified from the edges of the reduced geometry. A hard edge may be one where the outer angle of the edge where two adjacent ages meet satisfies a threshold. For example, if the outside angle is more than 270°, an edge may be identified as a hard edge. It will be appreciated that any suitable threshold angle can be used. An extended geometry can be generated at or otherwise based on an identified edge. For instance, a face may be generated that extends from the identified edge outward relative to an interior of the reduced geometry. In some examples, such a face may be referred to as a fin. The extended geometry at an identified edge can extend outward at the average normal computed for the corresponding vertex in example embodiments.

At (708), hard-occlusion data can be generated that is associated with at least a portion of the reduced geometry. For example, the hard-occlusion data can include one or hard-occlusion parameters that define a hard-occlusion region based on the reduced geometry. In some examples, the hard-occlusion region can encompass all of the reduced geometry. The hard-occlusion parameters may further define attributes associated with the hard-occlusion region. For instance, the hard-occlusion parameters may specify that full occlusion is to be utilized in rendering virtual elements relative to the hard-occlusion region. In another example the hard-occlusion parameters may specify an x-ray or other blending technique for combining the display data for a virtual element and image data at the hard-occlusion region. In some examples, the hard-occlusion parameters may specify a visual appearance of the visual virtual element based on a location corresponding to the hard-occlusion region.

At (710), soft-occlusion data is generated that is associated with the extended geometry determined at 706. For example, soft-occlusion data can include one or more soft-occlusion parameters that define a soft-occlusion region based on the extended geometry. The occlusion parameters can define the soft-occlusion region based on coordinates associated with the extended geometry. The occlusion parameters can further define attributes associated with the soft-occlusion region. For instance, the occlusion parameters may specify that display data from virtual element is to be combined with image data for rendering within the soft-occlusion region. The soft-occlusion parameters can specify a blending or concentration of display data at one or more locations of the soft-occlusion region. In some examples, soft-occlusion parameter(s) can specify an opacity gradient associated with the soft-occlusion region. Additionally and/or alternatively, soft-occlusion parameters can specify one occlusion bands associated with a predetermined concentration of display data.

According to example embodiments, an expected error associated with an estimated geometry may be used to determine a reduced geometry at 704 and/or an extended geometry at 706. For example, the geometric data may be associated with an expected error value indicating an expected error that may be present in the geometric data. In response to higher levels of expected error, a larger decrease in size can be applied to generate a reduced geometry and a larger increase in size can be applied to generate an extended geometry. In response to smaller expected errors, a smaller decrease in size can be applied to generate a reduced geometry and a smaller increase in size can be applied to generate an extended geometry.

Figure 7:
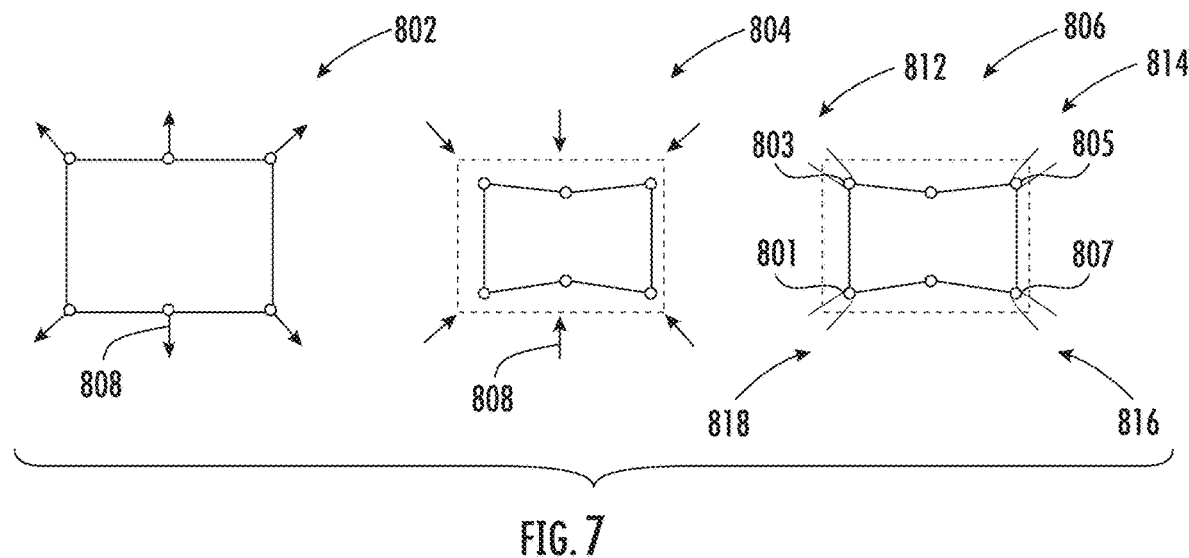
FIG. 7 depicts a block diagram illustrating a method of using a reduced geometry and an extended geometry of a physical object to generate a soft-occlusion region in accordance with example embodiments.

FIG. 7 is a graphical diagram depicting an example of generating a reduced geometry and an extended geometry based on an estimated geometry associated with a physical object. FIG. 7 depicts an estimated geometry 802 of an example physical object, such as a face or surface of a building. A computing system such as a server computing system 130 or user computing device 102 can access an estimated geometry 802, and generate a reduced geometry 804 and an extended geometry 806.

Referring to the estimated geometry 802, each vertex associated with the geometric data can be identified. Six vertices are identified from the estimated geometry 802 depicted in FIG. 7. For each vertex, the adjacent faces to the vertex are identified. A normal is then computed for each of the adjacent faces. An average normal can then be computed from the normal for each of the adjacent faces. An average normal 808 is depicted for each of the vertices of estimated geometry 802 in FIG. 7.

A reduced geometry 804 is then generated from the estimated geometry 802 based on the computed average normal associated with each vertex. As shown in FIG. 7, the estimated geometry is reduced by reducing one or more dimensions of the estimated geometry based on the average normal at each vertex. For example, the length or width of an adjacent face to a vertex can be reduced in size so shift the vertex based on the direction of the average normal as shown in FIG. 7.

After computing the reduced geometry 804, an extended geometry 806 can be computed. In this example, the extended geometry 806 includes a set of faces 812, 814, 816, 818 that extend outward from a subset of the vertices 801, 803, 805, 807 associated with the reduced geometry. The subset of vertices can be identified as those including a hard, convex edge. As earlier described, a hard convex edge can be identified as one where the outer angle of the edge joining the adjacent faces satisfies a threshold angle. In this example, each face 812, 814, 816, 818 extends outward from its corresponding vertex at the corresponding average normal for the vertex.

As illustrated in FIG. 7, each face 812, 814, 816, 818 extends a distance outward that is greater than the distance the corresponding vertex was moved inward to generate the reduced geometry. In this manner, each face will extend from one or more locations inside or within the original estimated geometry to one or more locations outside of the estimated geometry as depicted in FIG. 7. By way of example, the distance a face of the extended geometry extends outward may be twice the distance that the corresponding vertex was moved inward as part of generating the reduced geometry. It will be appreciated, however, that other ratios can be used by which the estimated geometry is reduced and extended.

Figure 8:
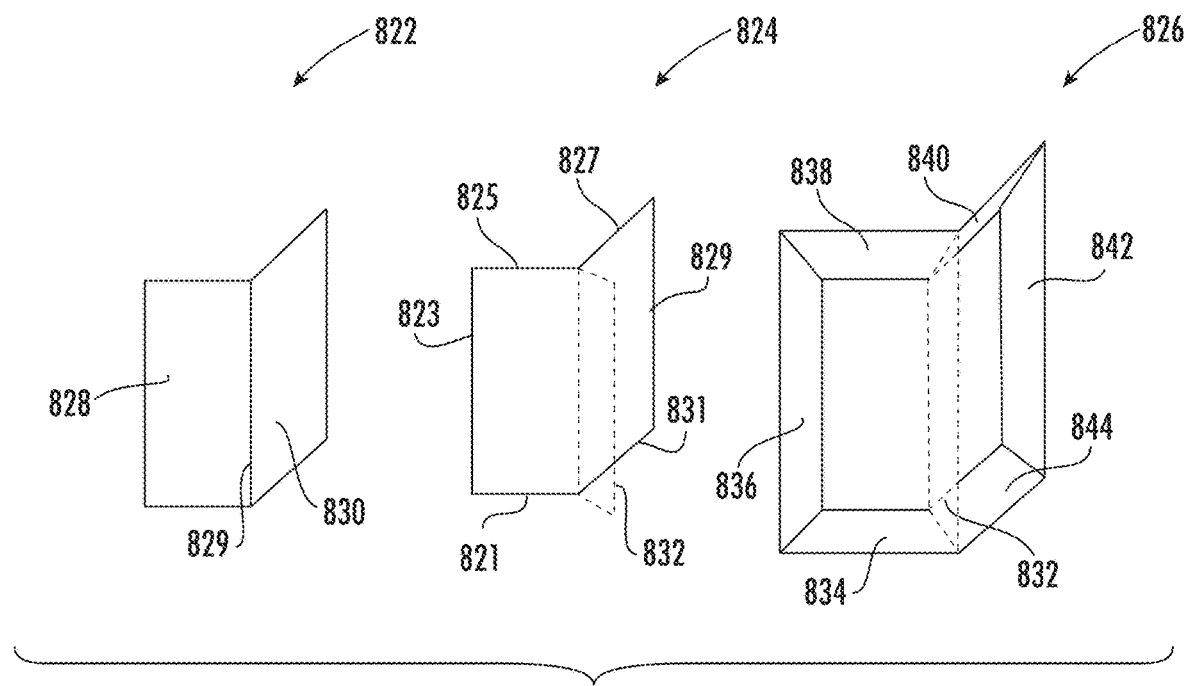
FIG. 8 depicts a block diagram illustrating a method of generating an extended geometry of a physical object for an occlusion region in accordance with example embodiments.

FIG. 8 is a graphical diagram depicting an example of generating an extended geometry that includes extended faces generated at hard edges of a reduced geometry as well as extended faces generated at open edges. FIG. 8 depicts a reduced geometry 822 which can be generated from an estimated geometry as earlier described. Reduced geometry 822 is a simple geometry including two faces 828 and 830 adjoined an edge 829. Edge 829 can be identified as a hard edge based on face 828 and face 830 adjoining at an angle that exceeds and angular threshold for example. At hard edge 829, an extended face 832 can be generated that extends outward at the average normal associated with faces 828 and 830.

A set of open edges associated with the reduced geometry 822 can then be identified. Open edges may exist because of incomplete geometric data. By way of example geometric data for a building may include facade data for vertical walls while not including geometric data for a top or bottom of the building. An open edge can be identified as one where the edge has only one connected triangle and/or one adjacent face. In FIG. 8, edges 821, 823, 825, 827, 829, 831 are identified as open edges.

At each of the open edges, an additional extended face (also referred to as a skirt) can be generated that extends outward from the open edge. An adjusted normal can be computed to determine a direction for adding an additional extended face at open edges. In FIG. 8 an extended geometry 826 is computed that includes extended faces 834, 836, 838, 840, 842, 844. In some examples, one or more soft-occlusion parameters can be generated defining a soft-occlusion region at each of the extended faces at the open edges. In other examples, one or more hard-occlusion parameters can be generated defining an occlusion region at each of the extended faces at the open edges.

Figure 9:
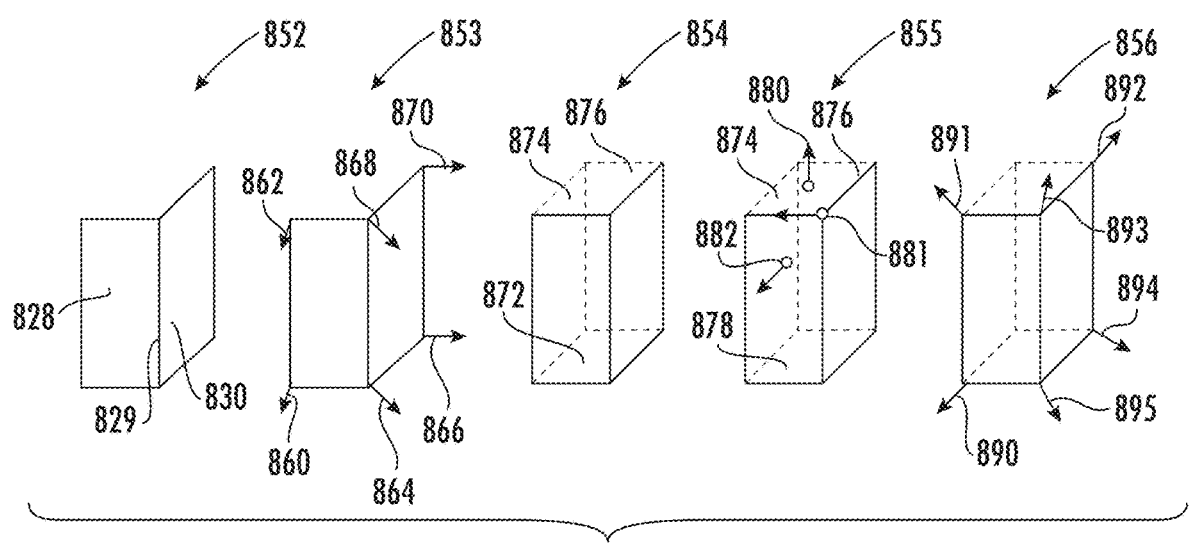
FIG. 9 depicts a block diagram illustrating a method of determining directions for an extended geometry based on simulated faces of a physical object in accordance with example embodiments.

FIG. 9 is a graphical diagram depicting an example of determining an adjusted average normal in accordance with example embodiments. The process depicted in FIG. 9 can be used to generate an extended geometry that includes extended faces along open edges of a reduced geometry. A reduced geometry is depicted at 852, including faces 828, 830 adjoined at an edge 829. An average normal is computed for each vertex of the reduced geometry. The average normal for each vertex can be computed as the average normal of each of the adjacent faces. A set of average normals 860, 862, 864, 866, 868, 870 are depicted at 853.

A set of simulated faces is then determined for each open edge as shown at 854. A simulated face represents an expected adjacent polygon at an open edge. In some examples, each open edge can be assumed to be a 90° corner. A simulated face can then be determined for the open edge. In FIG. 9, simulated faces 872, 874, and 876 are computed. For each open edge, a normal of the adjacent simulated face is computed by taking the cross product of the normal of the known face in the direction of the edge (consistent with the polygon winding order) as shown at 855. A set of normals 880, 881, 882 are computed for the set of simulated faces. An adjusted normal can then be computed for each vertex based on the average normal computed from the original faces and the normals of the simulated faces. For example, the original normal calculated from the original faces can be adjusted based on the normal associated with the adjacent simulated faces to the edge. In some examples, the normal form the simulated faces can be weighted to determine an adjusted normal. A set of adjusted normals 890, 891, 892, 893, 894, and 895 are depicted at 856.

Figure 10:
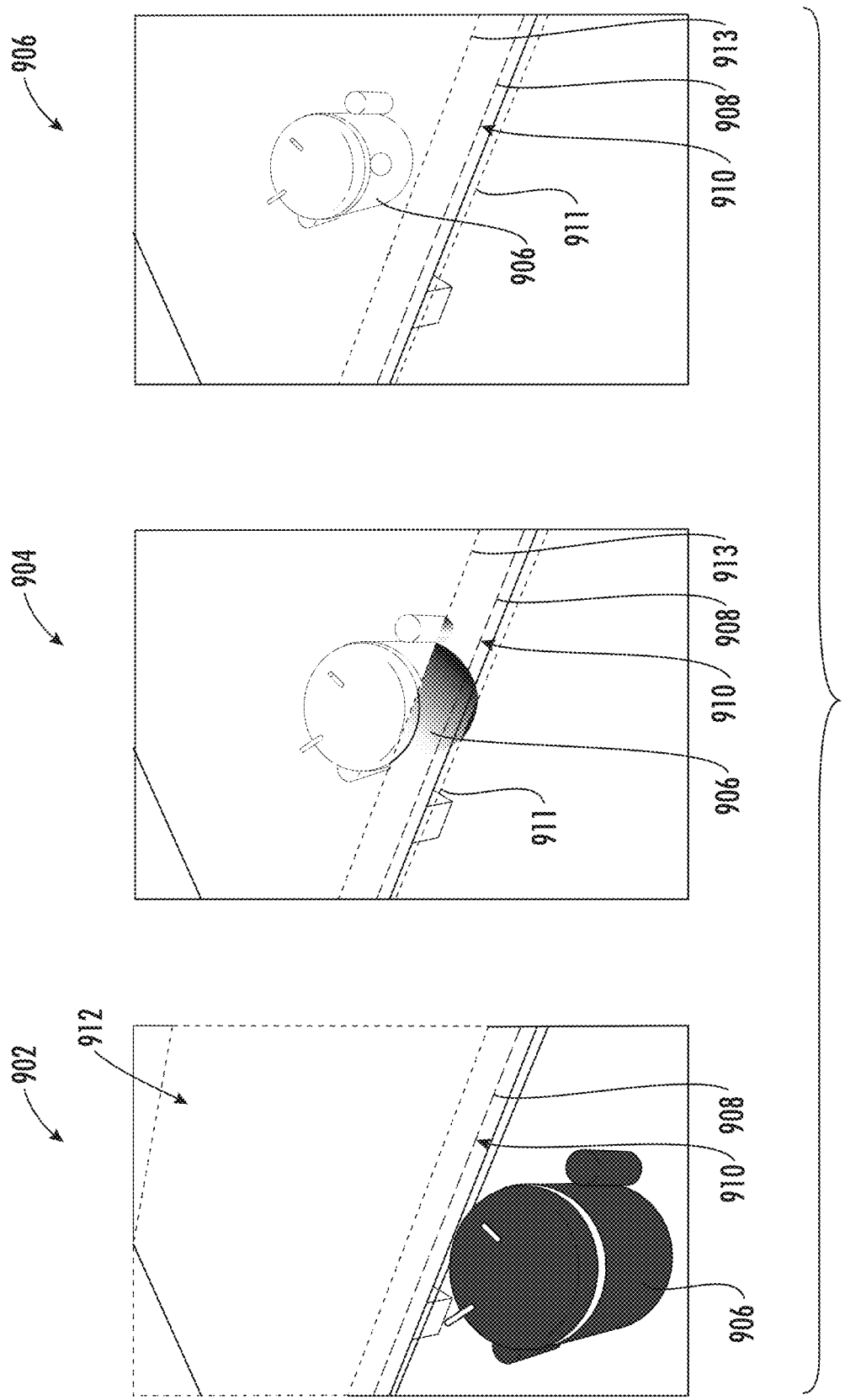
FIG. 10 depicts a graphical diagram of a sequence of example composite renders of image data of an environment and display data of a virtual element using a soft-occlusion region and hard-occlusion region in accordance with example embodiments.

FIG. 10 depicts a graphical diagram of a sequence of example composite renders of image data of an environment and display data of a virtual element using a soft-occlusion region and x-ray rendering within a hard-occlusion region in accordance with example embodiments. FIG. 10 depicts a sequence of composite images 922, 924, and 926 as may be captured from a video sequence or sequence of still images in which a virtual element 906 changes positions relative to the depicted environment in the images.

An estimated geometry 908 of a physical object (e.g., desk) as defined by geometric data is depicted relative to each composite image. One or more soft-occlusion parameters are used to define a soft-occlusion region 910 where virtual element 906 is selectively rendered using an opacity gradient. One or more hard-occlusion parameters are used to define a hard-occlusion region 912 where virtual element 906 will be rendered with an altered visual appearance if associated with a depth value greater than that of the occlusion data.

In composite image 922, virtual element 906 is fully positioned outside of soft-occlusion region 910 and hard-occlusion region 912. Accordingly virtual element 906 is fully rendered within the non-occluded region. Virtual element 906 is rendered with a first appearance outside of the soft-occlusion region and the hard-occlusion region.

In composite image 924, the location of virtual element 906 has changed such that a first portion of virtual element 906 is located within soft-occlusion region 910, and a second portion of virtual element 906 is positioned within hard-occlusion region 912. Within soft-occlusion region 910, virtual element 906 is rendered using an opacity gradient that defines a variable blending of display data for the virtual element across the soft-occlusion region. In this example, it can be seen that virtual element 906 is more fully rendered at locations adjacent an outer edge 913 relative to locations adjacent an inner edge 911. Between the edges the concentration varies such that the virtual element appears to be more fully rendered with a gradient across the soft-occlusion region. Within hard-occlusion region 912, virtual element 906 is rendered with an altered appearance. In the specific example, an outline of the virtual element 906 is depicted when present in the hard-occlusion region. It will be appreciated that other altered visual appearance is may be used. Generally, in the hard-occlusion region, an x-ray vision technique is used to make it appear as though the virtual element is occluded by the physical object but nevertheless allow the virtual element to appear.

In composite image 926, a location of virtual element 906 is fully within the hard-occlusion region 912. Accordingly, the composite image 926 is rendered with virtual element 906 having an altered appearance to indicate that the virtual element is occluded by the physical object but is nonetheless being displayed.

Figure 11:
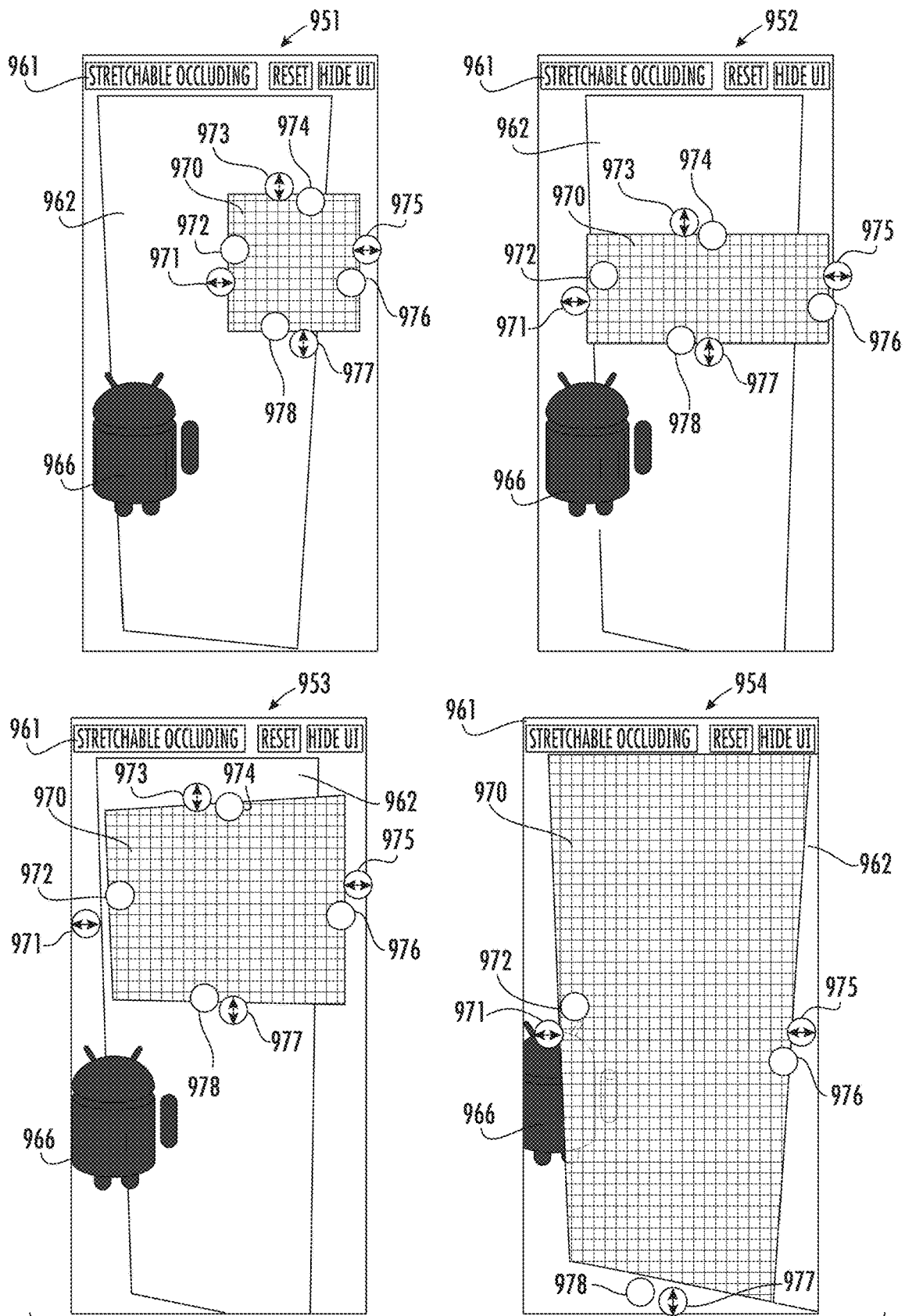
FIG. 11 depicts a graphical diagram of a sequence of example composite renders of image data and display data including a user interface for generating a soft-occlusion region in accordance with example embodiments.

FIG. 11 depicts a graphical diagram of a sequence of example composite renders of image data, including a graphical user interface that enables a user to generate soft-occlusion parameters. FIG. 11 depicts a sequence of composite images 951, 952, 953 and 954 as may be captured from a video sequence or sequence of still images in which a virtual element 966 is displayed relative to a wall 962.

A graphical user interface is depicted in image 951, including user interface (UI) elements 961 and 970-978. In some examples, a user may provide an input to a display of a computing device, such as by tapping a display to cause the UI elements to appear. For example, tapping the display of a computing device may cause UI element 961 to appear, including a menu that enables a user to modify soft-occlusion parameters. For example, UI element 961 may include a menu that enables different features such as an occlusion parameter definition. UI element may additionally include inputs to reset and/or hide the graphical user interface. A user may also tap the display to cause a UI element 970 to appear, depicting a representation of a geometry for a soft-occlusion region. UI elements 971-978 are input elements that allow a user to modify the geometry for the soft-occlusion region.

As shown in image 952, a user may provide an input to input element 971 and/or 972 and modify the geometry of the soft-occlusion region along a plane. In this example, an input at input element 971 and/or 972 enables a user to enlarge or shrink the plane in a left/right direction relative to the page. Similarly, a user may provide an input to input element 976 and/or 976 and modify the geometry of the soft-occlusion region in the left/right direction along the plane.

As shown in image 953, a user may provide an input to input element 973 and/or 974 and modify the geometry of the soft-occlusion region along the plane. In this example, an input at input element 973 and/or 974 enables a user to enlarge or shrink the plane in a top/down direction relative to the page. Similarly, as shown in image 954, a user may provide an input to input element 977 and/or 978 and modify the geometry of the soft-occlusion region in the top/down direction along the plane.

As shown in FIG. 11, a user can define and/or modify geometric data for a soft-occlusion region. Such a technique can facilitate testing of various concepts including x-ray vision, occluding planes, and dynamic soft-occlusion. Various inputs may be provided to edit a soft-occlusion region. For example, a one-finger drag may be used to move along a plane, a two-finger drag may be used to raise and/or lower elements, a two-finger rotation may be used to rotate elements, and a pinch may be used to scale elements.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system, comprising:
   one or more image sensors;

one or more processors; and
one or more non-transitory, computer-readable media that store instructions that when executed by the one or more processors cause the computing system to perform operations, the operations comprising:
obtaining display data for a virtual element to be displayed by the computing system in association with imagery from the one or more image sensors, the imagery depicting an environment including a physical object;
obtaining geometric data indicative of an estimated geometry of the physical object;
generating, based at least in part on the estimated geometry of the physical object, a set of graphics occlusion parameters associated with rendering the imagery and the display data, wherein the set of graphics occlusion parameters define blending of the display data for the virtual element and the imagery at a soft-occlusion region that includes one or more locations within the estimated geometry associated with the physical object, the graphics occlusion parameters define an opacity gradient that specifies a variable blending of the display data for the virtual element and image data comprising the imagery based on locations associated with the soft-occlusion region; and
rendering a composite image from the display data for the virtual element and the imagery based at least in part on the set of graphics occlusion parameters.

2. The computing system of claim 1, wherein:
the soft-occlusion region extends from the one or more locations within the estimated geometry associated with the physical object to one or more locations outside of the estimated geometry associated with the physical object.

3. The computing system of claim 1, wherein:
the opacity gradient specifies full occlusion of the virtual element at a first end of the soft-occlusion region adjacent to an edge of the physical object based on a reduced geometry of the physical object and non-occlusion of the display data for the virtual element at a second end of the soft-occlusion region furthest from the first end.

4. The computing system of claim 3, wherein:
the opacity gradient includes a plurality of bands, each of the bands specifying a different blending of the display data for the virtual element with the image data; and
a concentration of display data increases across the plurality of bands such that a concentration of display data in a first band including the first end is less than a concentration in a second band including the second end.

5. The computing system of claim 4, wherein:
the opacity gradient is non-uniform within one or more of the plurality of bands.

6. The computing system of claim 1, wherein generating the set of graphics occlusion parameters comprises:
determining a reduced geometry for the physical object based on the estimated geometry; and
identifying at least one edge of the physical object based on the reduced geometry, the at least one edge adjacent to a plurality of faces of the physical object as derived from the reduced geometry;
wherein the soft-occlusion region extends outward from the at the at least one edge.

7. The computing system of claim 6, wherein generating the set of graphics occlusion parameters comprises:

determining an average normal associated with the plurality of faces adjacent to the at least one edge;
wherein the soft-occlusion region extends from the at least one edge at a direction based at least in part on the average normal.

8. The computing system of claim 7, wherein generating the set of graphics occlusion parameters comprises:
identifying at least one open edge based on the reduced geometry;
generating geometric data for a simulated face associated with the at least one open edge;
determining an adjusted normal associated with the at least one open edge based at least in part on the simulated face; and
generating data indicative of an additional occlusion region extending outward from the at least one open edge at a direction based at least in part on the adjusted normal.

9. The computing system of claim 1, wherein obtaining geometric data indicative of an estimated geometry of the at least a portion of the physical object comprises:
generating the geometric data based on image recognition associated with the imagery of the environment.

10. The computing system of claim 1, wherein obtaining geometric data indicative of an estimated geometry of the at least a portion of the physical object comprises:
obtaining the geometric data from one or more remote computing devices in response to a query for geographic information associated with the environment.

11. The computing system of claim 1, wherein rendering the composite image comprises:
selectively rendering the display data at individual locations within the soft-occlusion region based on the set of graphics occlusion parameters.

12. A computer-implemented method, comprising:
obtaining, by one or more computing devices, geometric data indicative of an estimated geometry of a physical object in a geographic area;
determining, by the one or more computing devices and based at least in part on the estimated geometry, a reduced geometry associated with the physical object;
defining, by the one or more computing devices, a hard-occlusion region associated with at least a portion of the reduced geometry of the physical object and a soft-occlusion region associated with at least a portion of the estimated geometry of the physical object; and
rendering, by the one or more computing devices and based at least in part on the hard-occlusion region and the soft-occlusion region, a composite image including a virtual element and a visual depiction of the physical object in the geographic area.

13. The computer-implemented method of claim 12, further comprising:
defining an opacity gradient that specifies a variable blending of display data for the virtual element and image data depicting the physical object based on locations associated with the soft-occlusion region.

14. The computer-implemented method of claim 12, wherein:
determining the reduced geometry associated with the physical object comprises determining a reduced outer dimension associated with the physical object;
the soft-occlusion region extends outward from at least one edge that is adjacent to a plurality of faces of the physical object as derived from the reduced outer dimension; and the soft-occlusion region includes at least one location outside of the estimated geometry.

15. The computer-implemented method of claim 14, wherein defining the soft-occlusion region comprises:
   determining a direction based at least in part on an average normal associated with the plurality of faces adjacent to the at least one edge;
   wherein the soft-occlusion region extends from the at least one edge at a direction based at least in part on the average normal.

16. The computer-implemented method of claim 14, wherein defining the soft-occlusion region comprises:
   identifying at least one open edge based on the reduced outer dimension;
   generating geometric data for a simulated face associated with the at least one open edge;
   determining an adjusted normal for the at least one open edge based at least in part on the simulated face; and
   generating data indicative of an additional occlusion region extending outward from the at the at least one open edge at a direction based at least in part on the adjusted normal.

17. One or more non-transitory computer-readable media that store instructions that, when executed by one or more processors, cause the one or more processors to perform operations, the operations comprising:
   obtaining geometric data indicative of an estimated geometry of a physical object in a geographic area;
   determining a reduced geometry associated with the physical object based on the estimated geometry;
   generating hard-occlusion data associated with the physical object, the hard-occlusion data being associated with at least a portion of the reduced geometry of the physical object;
   generating soft-occlusion data indicative of a soft-occlusion region associated with the physical object, the soft-occlusion region extending from an edge associated with the reduced geometry; and
   providing, in response to at least one query for geometric data associated with a geographic area including the physical object, a response including the hard-occlusion data and the soft-occlusion data associated with the physical object.

18. The one or more non-transitory computer-readable media of claim 17, wherein:
   the soft-occlusion data defines an opacity gradient that specifies a variable blending of display data for a virtual element and image data depicting the physical object based on locations associated with the soft-occlusion region; and
   the hard-occlusion data defines full occlusion at locations associated with at least the portion of the reduced geometry of the physical object.

19. The one or more non-transitory computer-readable media of claim 17, wherein generating soft-occlusion data comprises:
   identifying at least one edge of the physical object based on the reduced geometry, the at least one edge adjacent to a plurality of faces of the physical object as derived from the reduced geometry; and
   determining an average normal associated with the plurality of faces adjacent to the at least one edge;
   wherein the soft-occlusion region extends outward from the at the at least one edge at a direction based at least in part on the average normal.

20. A computer-implemented method, comprising:
   obtaining, by one or more computing devices, display data for a virtual element to be displayed in association with imagery depicting an environment including a physical object;
   obtaining, by the one or more computing devices, geometric data indicative of an estimated geometry of the physical object;
   generating, by the one or more computing devices and based at least in part on the estimated geometry of the physical object, a set of graphics occlusion parameters associated with rendering the imagery and the display data, wherein the set of graphics occlusion parameters define blending of the display data for the virtual element and the imagery at a soft-occlusion region that includes one or more locations within the estimated geometry associated with the physical object; and
   rendering a composite image from the display data for the virtual element and the imagery based at least in part on the set of graphics occlusion parameters, wherein rendering the composite image comprises selectively rendering the display data at individual locations within the soft-occlusion region based on the set of graphics occlusion parameters.

21. The computer-implemented method of claim 20, wherein generating the set of graphics occlusion parameters comprises:
   determining a reduced geometry for the physical object based on the estimated geometry; and
   identifying at least one edge of the physical object based on the reduced geometry, the at least one edge adjacent to a plurality of faces of the physical object as derived from the reduced geometry;
   wherein the soft-occlusion region extends outward from the at the at least one edge.

* * * * *